United States Patent
Priebe et al.

(10) Patent No.: US 8,098,467 B2
(45) Date of Patent: Jan. 17, 2012

(54) METHOD FOR AVOIDANCE OF INADVERTENT PROTECTIVE TRIPPING AS A RESULT OF MEASUREMENT ERRORS WITHIN A PROTECTION SYSTEM FOR AN HVDC TRANSMISSION INSTALLATION

(75) Inventors: Torsten Priebe, Erlangen (DE); John-William Strauss, Rötenbach (DE)

(73) Assignee: Siemens Aktiengesellschaft, Munich (DE)

(*) Notice: Subject to any disclaimer, the term of this patent is extended or adjusted under 35 U.S.C. 154(b) by 1078 days.

(21) Appl. No.: 11/916,382

(22) PCT Filed: Jun. 2, 2005

(86) PCT No.: PCT/DE2005/001024
§ 371 (c)(1),
(2), (4) Date: Dec. 3, 2007

(87) PCT Pub. No.: WO2006/128397
PCT Pub. Date: Dec. 7, 2006

(65) Prior Publication Data
US 2010/0145537 A1  Jun. 10, 2010

(51) Int. Cl.
*H02H 3/00* (2006.01)
*H02H 3/08* (2006.01)
*H02H 9/02* (2006.01)

(52) U.S. Cl. ........ 361/79; 361/93.1; 361/93.5; 361/93.6

(58) Field of Classification Search ............... 361/93.1, 361/79
See application file for complete search history.

(56) References Cited

U.S. PATENT DOCUMENTS

| | | | | |
|---|---|---|---|---|
| 4,135,152 | A * | 1/1979 | Stuchly et al. | 324/627 |
| 5,737,166 | A | 4/1998 | Hagman | |
| 2006/0018060 | A1 * | 1/2006 | Elms et al. | 361/42 |

FOREIGN PATENT DOCUMENTS
FR  2694635 A1  2/1994

OTHER PUBLICATIONS

Kirrman: "Fault-Tolerant Issues in the Design of a Highly Available High-Speed Controller for HVDC Transmission" International Symposium on Fault Tolerant Computing Systems (FTCS) Vienna, Jul. 1-4, 1986, International Symposium on Fault Tolerant Computing Systems (FTCS) New York, IEEE, US Jul. 1986, pp. 184-189, XP000757394.

Jiangguo et al.: "Reliable Control and Protection System for the Tian—Guang HVDC Transmission Project", Power System Technology, 2002, Proceedings, Powercon 2002, International Conference on, Piscataway, NJ, USA, IEEE, vol. 2, Oct. 23, 2002, pp. 688-695, XP010614842.

International search Report dated Jan. 27, 2006.
Chinese Office Action dated Mar. 13, 2009.

* cited by examiner

*Primary Examiner* — Dharti Patel
(74) *Attorney, Agent, or Firm* — Laurence A. Greenberg; Werner H. Stemer; Ralph E. Locher

(57) ABSTRACT

A method for avoiding undesired, measurement error-induced protective tripping within a protection system of an HVDC transmission system. State variables of components of the HVDC transmission system are detected by first measuring devices to obtain a first set of measured values and by further measuring devices, which are designed in redundant fashion with respect to the first measuring devices, to obtain further sets of measured values. The first and further sets of measured values are supplied to a closed-loop control unit and a protective unit. The protective unit checks the first set of measured values for the presence of a risk of protective tripping by way of internal logic, and the closed-loop control unit regulates the HVDC transmission system as a function of one of the further sets of measured values. In the event of the presence of a risk of protective tripping, the protective unit checks one of the further sets of measured values for the presence of switchover conditions and, if present, switches over to the further set of measured values and checks the further set of measured values for the presence of a risk of protective tripping.

11 Claims, 2 Drawing Sheets

METHOD FOR AVOIDANCE OF INADVERTENT PROTECTIVE TRIPPING AS A RESULT OF MEASUREMENT ERRORS WITHIN A PROTECTION SYSTEM FOR AN HVDC TRANSMISSION INSTALLATION

Method for avoidance of inadvertent protective tripping as a result of measurement errors within a protection system for an HVDC transmission installation

BACKGROUND OF THE INVENTION

Field of the Invention

The invention relates to a method for avoidance of inadvertent protective tripping as a result of measurement errors within a protection system for an HVDC transmission installation.

Methods such as these are already known from the general prior art. In the already known methods, the avoidance of spurious tripping is based on a so-called choice of two-from-three.

This means that at least two of the three protection systems must respond in order to initiate disconnection of the installation. Because of the low probability of measured value errors occurring at the same time, only one protection system is generally affected. A single case of spurious tripping of an individual protection system therefore does not lead to disconnection of the installation. The disadvantages of this two-from-three method are obvious. For example, all the measurement points and protective devices in the installation must be triplicated. This leads to high costs because of the complex wiring and the large number of devices.

BRIEF SUMMARY OF THE INVENTION

The object of the invention is to provide a method of the type mentioned initially which can be implemented easily and costs little.

The invention achieves this object by a method for avoidance of inadvertent protective tripping as a result of measurement errors within a control system for an HVDC transmission installation, in which
state variables of components of the HVDC transmission installation are recorded by first instruments with a first measured value set being obtained, and by further instruments which are designed to be redundant with respect to the first instruments, with further measured value sets being obtained,
the first measured value set and the further measured value sets are supplied to a protection unit with the protection unit checking the first measured value set for the presence of any risk of protective tripping, by means of internal logic,
and, if there is a risk of protective tripping, checks one of the further measured value sets for the presence of switching conditions and, if switching conditions are present, switches to this further measured value set and checks this further measured value set for the presence of a risk of protective tripping.

According to the present invention, the occurrence of a risk of tripping is detected shortly before the actual tripping command is emitted, as a result of which command specific expedient safety actions, for example the opening of a circuit breaker, the non-triggering of thyristor valves and the like, are implemented. In principle a risk of tripping may be detected in any desired manner. Expedient examples for determining a risk of tripping will be described in the following text. In principle, the risk of tripping is detected on the basis of the first measured value set, which was produced on the basis of the measured values from a plurality of instruments. In this case, each instrument is of redundant design. This means that each instrument has a further associated instrument which is able to replace the first instrument if it fails. In order to avoid unnecessary initiation of protective measures, the invention is used to determine whether the risk of tripping has been detected just as a result of one fault in one of the instruments, or one of the connecting channels. For this reason, after detecting that there is a risk of tripping, that is to say before implementing the protection measures, the protection unit checks one of the further measured value sets for the presence of switching conditions. Switching conditions are present when the further measured value set under consideration has measured values from which it can be deduced that the HVDC transmission installation is being operated normally. When switching conditions such as these are present, this leads to the deduction of a measurement error. The protection unit switches to the further measured value set. In other words, the protection unit checks the further measured value set for the presence of a risk of protective tripping, and, in the end, also for the presence of protective tripping.

The protection tripping unit advantageously switches to the further measured value set which is used as the basis for control of the control unit. This expedient further development of the method according to the invention is implemented whenever only one further measured value set is provided in addition to the first measured value set. This saves considerable costs. Therefore, in practice, two identical measured value sets are produced virtually exclusively.

The protection unit advantageously checks for any risk of protective tripping once again on the basis of the first measured value set after an adjustable, predefined switching time. According to this further development, the protection unit switches back to the first measured value set again once the switching time has passed. If only a temporary fault has occurred in the first measured value system, the protection check can be carried out again on the basis of the first measured value set. The HVDC transmission installation is then being operated normally. If the measurement error still persists after the switching time has passed, this leads to repeated detection of a risk of protective tripping, as a result of which the described process is repeated.

According to one expedient further development relating to this, the process ceases to switch back to the checking of the first measured value set after a previously determined number of unsuccessful attempts. In this case, a fault message is sent to a user, who carries out the necessary maintenance steps in conjunction with the instruments and the connecting channels for the first measured value set.

The check for the presence of the risk of protective tripping expediently comprises addition of measured values over a specific time period, with there being a risk of protective tripping when the sum of the added measured values exceeds the percentage component of a tripping threshold value. According to this advantageous further development of the invention, the risk of protective tripping is detected by integration of specific measured values of the first and/or of the further measured value set. If the sum, or in other words the integral, of the investigated measured values is tending towards the tripping threshold value within the specific time period, the risk of protective tripping is detected at a time shortly before this tripping threshold value is reached.

In contrast to this, the risk of protective tripping is detected when the measured values of the respectively investigated measured value set continuously exceed a tripping threshold value, which is predetermined by the protection unit, over a predetermined pre-warning time period. The pre-warning time period is expediently shorter than the tripping time period after which the protective measures are initiated if the tripping threshold value is still exceeded.

According to one preferred exemplary embodiment, the protection units and the control units are of redundant design. The redundant design increases the operational reliability of the HVDC transmission installation.

The switching time is advantageously between one and ten seconds. In practice, a switching time within this range has proved to be particularly expedient.

According to a further advantageous refinement to the invention, the check for the switching conditions comprises the detection of any discrepancy between measured values which correspond to direct currents flowing in a direct-current circuit in the HVDC transmission installation and/or expediently converted alternating currents, with the switching conditions occurring when the discrepancy is less than a switching threshold value. According to this expedient further development of the invention, the switching condition is detected by using direct currents and/or expediently converted alternating currents which are respectively flowing in the direct-current circuit or in the alternating-current connections of the converters. In this case, it is assumed that there will be major discrepancies between the measured values within a short time period in a conspicuous form in the event of a fault, while, during normal operation, only minor discrepancies will be detected, caused by measurement accuracies between the measured values of the currents. Therefore, if no such fault is present in the HVDC transmission installation and only one measured value error exists, then the evaluation of the measured values in only one of the measured value sets will lead to a discrepancy.

Switching to the redundant measured value set of the relevant protection system is made possible on the basis of this information. In the event of a fault, discrepancies in the measured values exceeding the switching threshold value will generally be expected in all the measured value sets. In one preferred exemplary embodiment, the discrepancy is calculated by determining the maximum and the minimum of the direct-current values, with the difference between the maximum and the minimum subsequently being formed. A corresponding situation applies to the expediently converted alternating currents. By way of example, the expedient conversion comprises the calculation of the direct current from the alternating currents measured in the alternating-current connections between the transformer and converter in the HVDC transmission installation.

Protective tripping advantageously takes place if the switching conditions are not present. If, for example, a check of the switching conditions leads to the conclusion that the HVDC transmission installation is no longer being operated normally as a result of a discrepancy, determined as before, between the respective direct-current values and/or the expediently converted alternating-current values, the respectively expedient protective measure is taken, without switching to the redundant measured value set. By way of example, this may be non-triggering of thyristor valves or the like, thus interrupting the power transmission. It is also possible to trip circuit breakers or the like, within the scope of the invention.

Further expedient refinements and advantages are the subject matter of the following description of exemplary embodiments of the invention with reference to the figures of the drawing, with the same reference symbols being used to refer to the same components, and in which:

DESCRIPTION OF THE INVENTION

Figure 1:
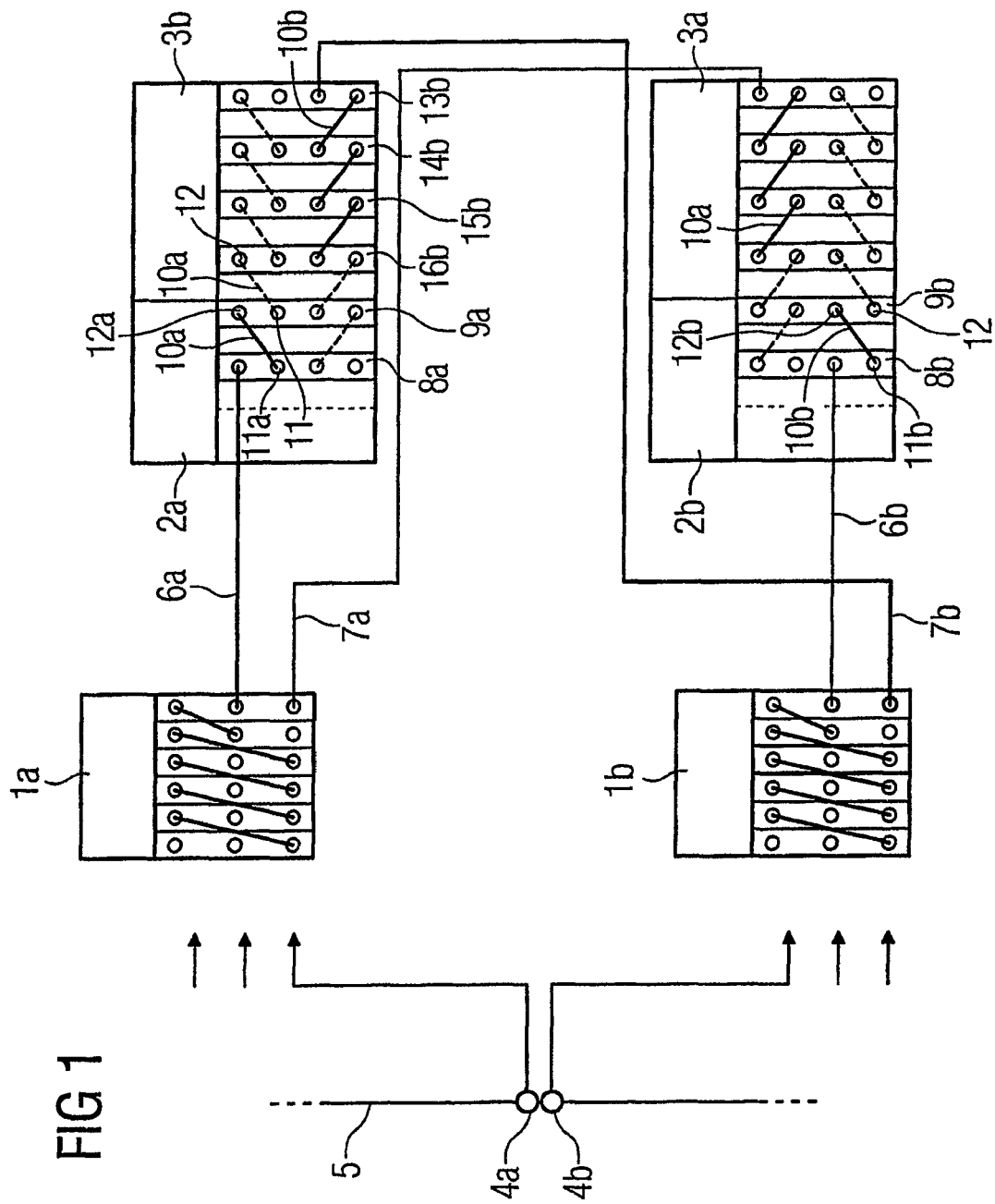
FIG. 1 schematically illustrates the design of the protection and control system for an HVDC transmission installation.

FIG. 1 shows a schematic illustration of a protection and control system for an HVDC transmission installation for carrying out the invention. FIG. 1 shows preprocessing means 1a, 1b of redundant design, as well as control units 2a, 2b, likewise of redundant design, together with protection units 3a and 3b. The preprocessing means 1a and 1b are connected to a series of instruments, which are each of redundant design and of which FIG. 1 shows only the current transformers 4a and 4b of redundant design. The current transformers 4a and 4b have a common primary winding and produce secondary voltages in the low-voltage range, which are proportional to an alternating current flowing through a busbar 5 in the HVDC transmission installation. Further measured values in the measured value sets relate to currents and voltages of other components in the HVDC transmission installation, on their alternating-current side and currents and voltages in the direct-current circuit which is not illustrated, in which case the measured values can be transmitted to the preprocessing means 1a, 1b in the form of optical digital signals, as well.

The measured values from the instruments, which are of redundant design, are respectively supplied to the associated redundant preprocessing means. These are equipped with suitable means, for example measured value converters for conversion of the low-voltage values to lower voltages, opto-electronic converters, sampling means and analog/digital converters, such that the preprocessing means 1a produces a first measured value set which comprises the measured values fed in from a plurality of instruments, as well as a synchronization clock for synchronization of the further closed-loop and open-loop control. The preprocessing means 1b produces a corresponding second measured value set, whose contents are essentially the same as those of the first measured value set during normal operation, as a further measured value set.

The first measured value set, that is to say the measured values following one another in time from all the first instruments, is transmitted via a first optical waveguide 6a to the first control unit 2a and is supplied via a second optical waveguide 7a to the protection unit 3a. The second measured value set is supplied to the control unit 2b via the optical waveguide 6b, and is supplied via the optical waveguide 7b to the protection unit 3b. During normal operation, the control unit 2a and the protection unit 3a, which is separated from it, carry out control and/or protective monitoring on the basis of the first measured value set, which is produced by the preprocessing means 1a. The control unit 2b and the protection unit 3b, which is arranged at the bottom in the figure, carry out the control and/or the protection of the HVDC transmission installation on the basis of the second measured value set during normal operation, with this second measured value set being produced by the preprocessing means 1b. The control unit 2b and the protection unit 3a are respectively designed to be redundant with respect to the control unit 2a and the protection unit 3b, which carry out the control and protection of the HVDC transmission installation during normal operation.

If a malfunction of the control unit 2a or of the protection unit 3b is found, this results in switching to the control unit 2b and blocking of the protection unit 3b. The protection units 3a and 3b are operated at the same time during normal operation. The preconditions and conditions for such switching or blocking are assumed to be known.

The respective control units 2a and 2b have withdrawable control inserts 8a, 9a and 8b and 9b, respectively. Each withdrawable control insert 8a, 8b, 9a, 9b is designed to control one or more specific active components of the HVDC transmission installation. The output 11a of the withdrawable control insert 8a is connected to the input 12a of the withdrawable control insert 9a through an optical waveguide link 10a. A corresponding situation applies to the output 11b of the withdrawable control insert 8b and the input 12b of the withdrawable control insert 8b. The protection unit 3b comprises, in a corresponding manner, withdrawable protection inserts 13b, 14b, 15b and 16b, whose outputs and inputs are once again connected to one another by means of optical waveguide links 10b and 10a.

During normal operation, the first measured value set of the preprocessing means 1a is the preferred measured value set for the control unit 2a. In other words, the control unit 2a provides the control function during normal operation on the basis of the first measured value set. For this reason, the first measured value set is shown by solid lines between the withdrawable control inserts 8a and 9a of the control unit 2a. The protection function of the protection unit 3b is, however, carried out during normal operation on the basis of the second measured value set, which is produced by the preprocessing means 1b. In order, however, to additionally provide the protection unit 3b with the first measured value set, the output 11 of the withdrawable control insert 9a of the control unit 2a is connected to the input 12 of the withdrawable protection insert 16b of the protection unit 3b by means of an optical waveguide link 10a, although this is indicated by dashed lines in FIG. 1, in order to show that it transmits a measured value set which is used only to replace the active measured value set in the case of a fault. A corresponding situation applies to the control unit 2b and the protection unit 3a, which likewise have optical waveguide links 10a that are represented by solid and dashed lines.

Figure 2:
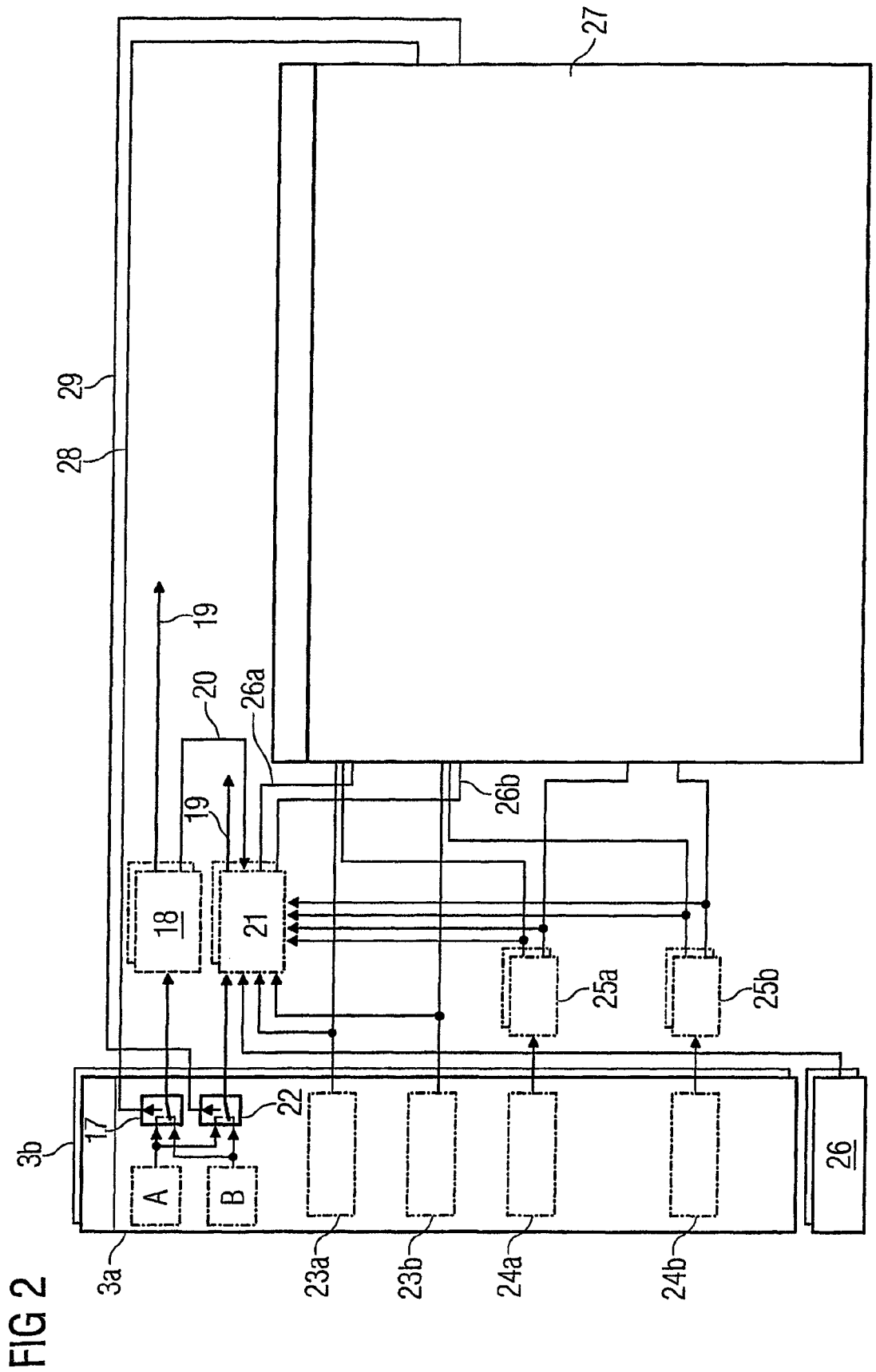
FIG. 2 shows a schematic illustration of one exemplary embodiment of the invention.

FIG. 2 shows, schematically, one exemplary embodiment of the present invention. The redundant control units are represented by functional boxes 3a and 3b, offset in a perspective form. The following text refers exclusively to the protection device 3a, although it should be noted that the protective device 3b is designed in a corresponding manner.

The protective device 3a has a protection function switching means 17 allowing a choice to be made between the first measured value set A and the second measured value set B. The measured value set chosen by the protection function switching means 17 is supplied to the protection logic 18. During normal operation, the protection logic 18 checks the tripping condition on the basis of the first measured value set A. In the described example, a tripping condition occurs when one measured value in the first measured value set exceeds a configurable tripping threshold value over a time period of six milliseconds. Three milliseconds before the initiation of the protection function by means of the instruction 19, the protection logic 18 finds that there is a risk of tripping and passes an appropriate initial warning instruction 20 to a risk of tripping routine 21. The risk of tripping routine 21 now checks for the presence of switching conditions for switching to the second measured value set B. Switching means 22 are provided in order to optionally provide the risk of tripping routine 21 with the first measured value set A or the second measured value set B. Furthermore, the risk of tripping routine 21 is connected to a first physical bus checker 23a and to a second physical bus checker 23b, which provide information as to whether the connecting lines for the respective measured value set are sound, or whether a physical malfunction has occurred.

Furthermore, first measured value checkers 24a and 25a as well as second measured value checkers 24a and 25b are provided and contain details as to whether faults have occurred during the formation of the first measured value set or of the second measured value set. Faults such as these reflect, for example, faults in the sampling of analog measured values in the instruments, during analog/digital conversion, or the like. Furthermore, the risk of tripping routine 21 is supplied with status information 26 relating to the entire HVDC transmission installation.

If there are no faults in the physical connecting lines which have been found by the bus checker 23a or 23b, and the measured value sets have also been determined and preprocessed without any errors, as can be detected by access to the respective measurement data checkers 24a and 25a or 24b and 25b, the risk of tripping routine 21 checks the second measured value set B for the presence of switching conditions. These conditions are met if the second measured value set B comprises measured values which correspond to normal operation of the HVDC transmission installation. Normal operation such as this is checked in the present exemplary embodiment by comparison of measured values which are proportional to the direct current in the DC voltage circuit of the HVDC transmission installation. This is based on the assumption that the discrepancy between the current measured values during normal operation is small. If a protection function is initiated by defined threshold values being overshot or undershot by the difference between the determined maximum and minimum direct current, the protection command is initiated, by means of the command 19, once a defined delay time has elapsed, which is associated with the respective protection function.

In the present case, switching to the second measured value set B takes place a few milliseconds before the delay time has elapsed. After five seconds, switching takes place back to the first measured value set A, so that checking for the presence of a tripping condition is once again carried out on the basis of the first measured value set A. If a risk of tripping is detected again, the previously described switching process is repeated. After a further switching process within 65 seconds from the first switching event, the check is carried out permanently on the basis of the second measured value set B and a fault message is sent to the operator of the HVDC transmission installation so that the appropriate maintenance work can be carried out on the components of the first measured value system.

The invention claimed is:

1. A method of avoiding inadvertent protective tripping as a result of measurement errors within a protection system for an HVDC transmission installation, the method which comprises:

detecting state variables of components of the HVDC transmission installation with first instruments, to acquire a first measured value set, and with further instruments, which are redundant with respect to the first instruments, to acquire further measured value sets;

supplying the first measured value set and the further measured value sets to a protection unit, and checking the first measured value set with an internal logic of the protection unit for a presence of any risk of protective tripping;

if a risk of protective tripping is found to be present, checking one of the further measured value sets for a presence of switching conditions and, if switching conditions are present, switching over to the further measured value set and checking the further measured value set for the presence of a risk of protective tripping.

2. The method according to claim 1, wherein the protection unit switches to the further measured value set used by the control unit as the basis for the control thereof.

3. The method according to claim 1, which comprises, after an adjustable switching time, once again checking with the protection unit for any risk of protective tripping on the basis of the first measured value set.

4. The method according to claim 3, which comprises adjusting the switching time to between one and ten seconds.

5. The method according to claim 1, wherein the check for the presence of the risk of protective tripping comprises adding measured values from the respective measured value set over a specific time period, and determining that a risk of protective tripping is present when a sum of the added measured values exceeds a percentage component of a tripping threshold value.

6. The method according to claim 1, which comprises determining that a risk of protective tripping exists when measured values in the respectively investigated measured value set continuously exceed a tripping threshold value set for the protection unit over a predetermined pre-warning time period.

7. The method according to claim 1, wherein the protection unit and the control unit are redundant units.

8. The method according to claim 1, wherein checking for the switching conditions comprises detecting any discrepancy between measured values that correspond to direct currents flowing in a direct-current circuit in the HVDC transmission installation and/or expediently converted alternating currents, and determining that the switching conditions exist when the discrepancy is less than a switching threshold value.

9. The method according to claim 1, which comprises triggering the protective tripping if the switching conditions are not present.

10. The method according to claim 1, which comprises producing the first measured value set and the further measured value sets by arranging different measured values in a time sequence by way of preprocessing means respectively associated with the first measured value set and the further measured value set.

11. The method according to claim 10, which comprises providing, with the preprocessing means, the first measured value set and the further measured value sets with a synchronization clock that is common to all the measured values in the respective measured value set.

* * * * *